March 19, 1963

G. H. HANKEN 3,081,925

SELF-THREADING MOTION PICTURE PROJECTOR

Filed Aug. 18, 1960

George H. Hanken
INVENTOR.

BY R. Frank Smith
Steve W. Ginsburg
ATTORNEYS

March 19, 1963 G. H. HANKEN 3,081,925
SELF-THREADING MOTION PICTURE PROJECTOR
Filed Aug. 18, 1960 3 Sheets-Sheet 3
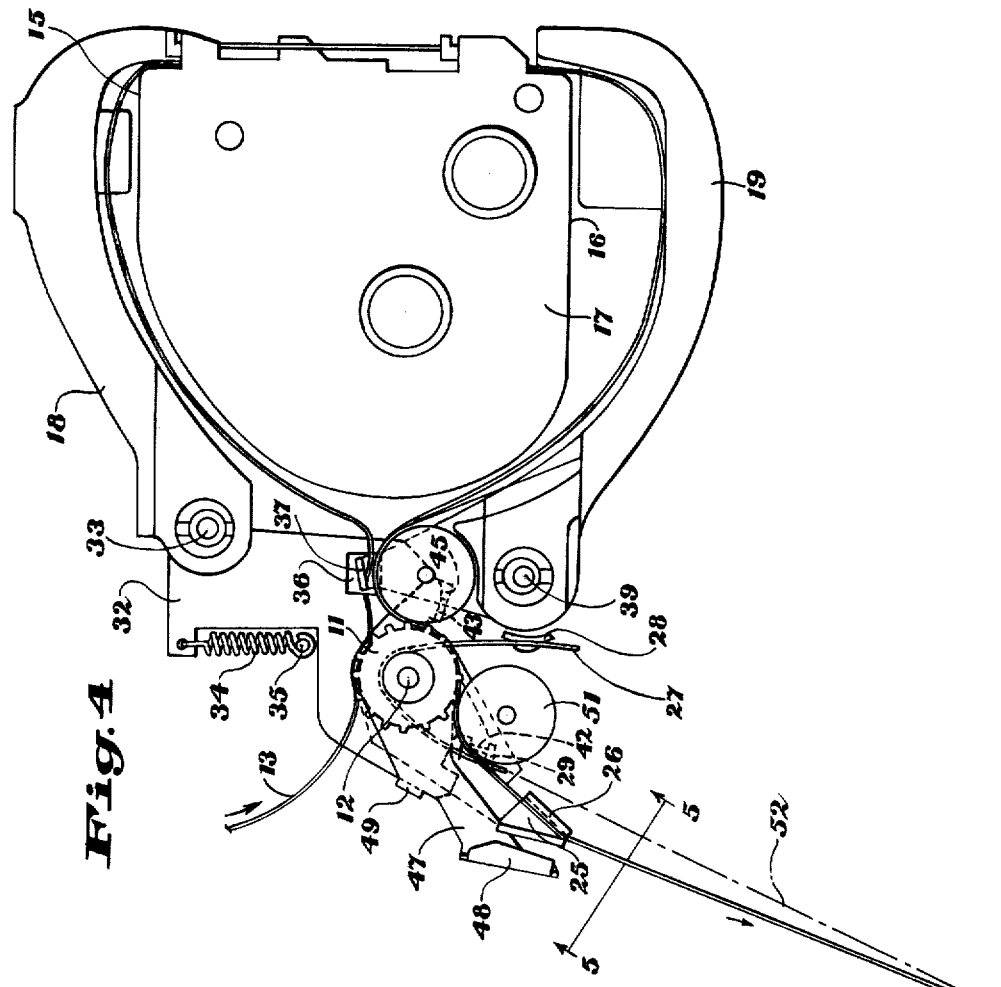
Fig.4
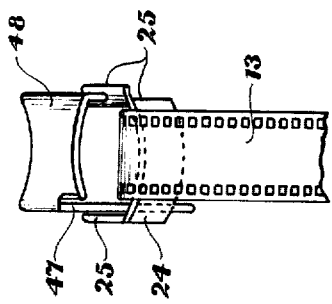
Fig.5
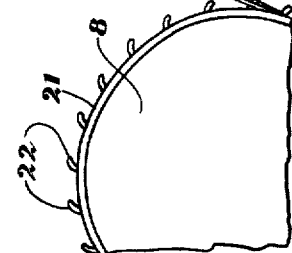
George H. Hanken
INVENTOR.
BY
ATTORNEYS United States Patent Office 3,081,925
Patented Mar. 19, 1963

3,081,925
SELF-THREADING MOTION PICTURE
PROJECTOR
George H. Hanken, Rochester, N.Y., assignor to Eastman Kodak Company, Rochester, N.Y., a corporation of New Jersey
Filed Aug. 18, 1960, Ser. No. 50,380
17 Claims. (Cl. 226—91)

This invention relates generally to projectors, and more specifically to an improved completely automatic self-threading motion picture projector.

It is generally old in the motion-picture projector art to provide a projector with loop-formers movable between a threading position for guiding or threading a film through the projector, and an open position for withdrawing the loop-formers from the film to provide a free loop of film above and below the pulldown claw. The free loops of film are necessary because the sprocket transports the film with a continuous motion whereas the pulldown claw transports the film with an intermittent motion. The loop-formers are normally provided with a latch for releasably holding the loop-formers in their threading position. Loop-former latch mechanisms for a projector are generally old in the art, one form of such mechanism being disclosed in U.S. Patent 2,420,587 to Dietrich which issued on May 13, 1947.

The present invention involves a completely automatic self-threading projector in which all the operator has to do is insert the leading end of the film from the supply reel into the projector into engagement with the transport mechanism. The transport mechanism advances the film through the loop-formers in their closed position for threading the film through the projector, and directs the leading end of the film onto a take-up reel which automatically engages the film perforations and winds the film thereon. An improved loop-former latch mechanism is interposed between the sprocket and the take-up reel and is actuable by the film as it is wound onto the take-up reel for releasing the loop-formers.

One of the primary objects of this invention is to provide a completely automatic projector in which all the operator has to do is introduce the leading end of the filmstrip from the supply reel into engagement with the transport mechanism.

Another object of the present invention is to provide an improved loop-former latch mechanism for a projector which is actuable by the film tension applied to the filmstrip by the takeup reel.

Still another object of this invention is to provide an improved loop-former latch mechanism for a projector that is of simple design and construction, thoroughly reliable and efficient in operation, and economical to manufacture.

A further object of this invention is to provide an improved loop-former latch mechanism having a guard structure for preventing inadvertent release of the loop-formers by the operator.

Objects and advantages other than those set forth above will be apparent from the following description when read in connection with the accompanying drawings, in which:

FIG. 4 is a view similar to FIG. 3 showing the loop-formers in a threading position, and the loop-former latch mechanism in a latched position; and FIG. 5 is a segmental view of the guard and guide members of FIG. 4 looking in the direction of arrows 5—5.

Figure 1:
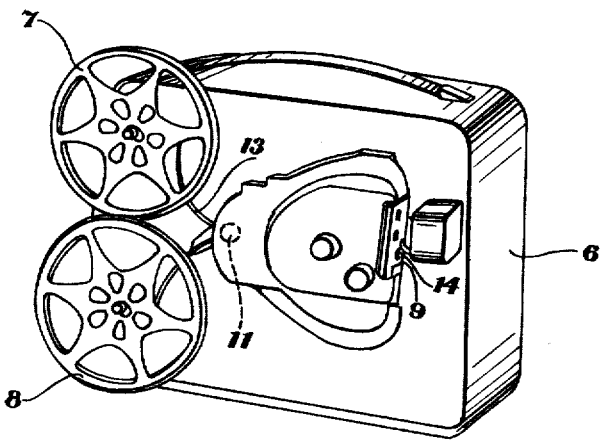
FIG. 1 is a perspective view of a projector in which a preferred embodiment of the invention is embodied.
Figure 3:
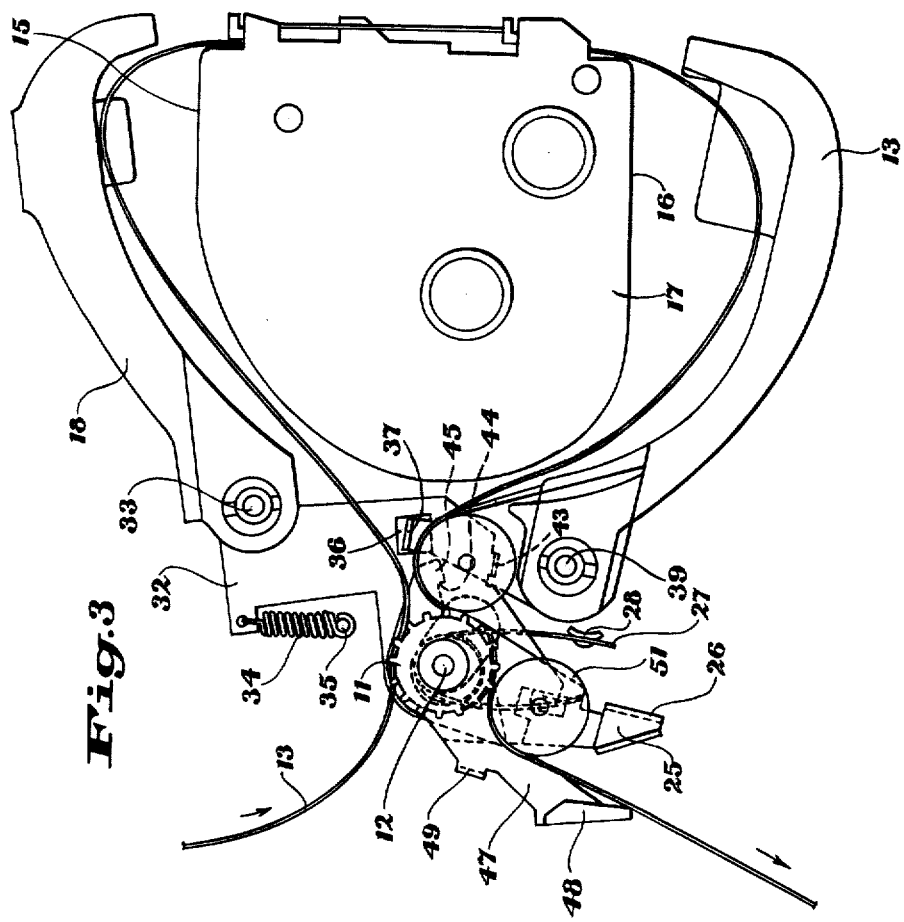
FIG. 3 is an elevation view of a portion of the projector showing the loop-formers in an open position, and the loop former latch mechanism in a released position.

As shown in the drawings, particularly FIG. 1, a moving-picture projector 6 is disclosed having respective supply and takeup reels 7 and 8, a film gate 9, a drive sprocket 11 rotatably mounted on shaft 12 and adapted in operation to transport a film 13 with a continuous motion to and from film gate 9, and a pulldown mechanism 14 for transporting film 13 with an intermittent motion through film gate 9. Interposed between film gate 9 and sprocket 11 are fixed upper and lower film guides 15, 16 respectively formed as a unitary member 17 secured to projector 6. Upper and lower pivotal loop-formers 18, 19 respectively cooperate with respective fixed film guides 15, 16 and are movable between a closed or threading position as seen in FIG. 4 and an open position as seen in FIG. 3. The upper and lower loop-formers 18, 19 respectively, and their respective film guides 15, 16 cooperate in the closed position for threading or guiding film 13 through projector 6. The loop-formers 18, 19 in the open position are withdrawn from the respective film guides 15, 16 and film 13 so that a free loop of film is formed therebetween. The take-up reel 8 has a ring 21 as seen in FIG. 4 slidably mounted on its hub and having projections 22 extending therefrom which automatically engage the perforations in film 13 for winding the film thereon as it is discharged from projector 6 by sprocket 11 into engagement with the periphery of ring 21.

Figure 2:
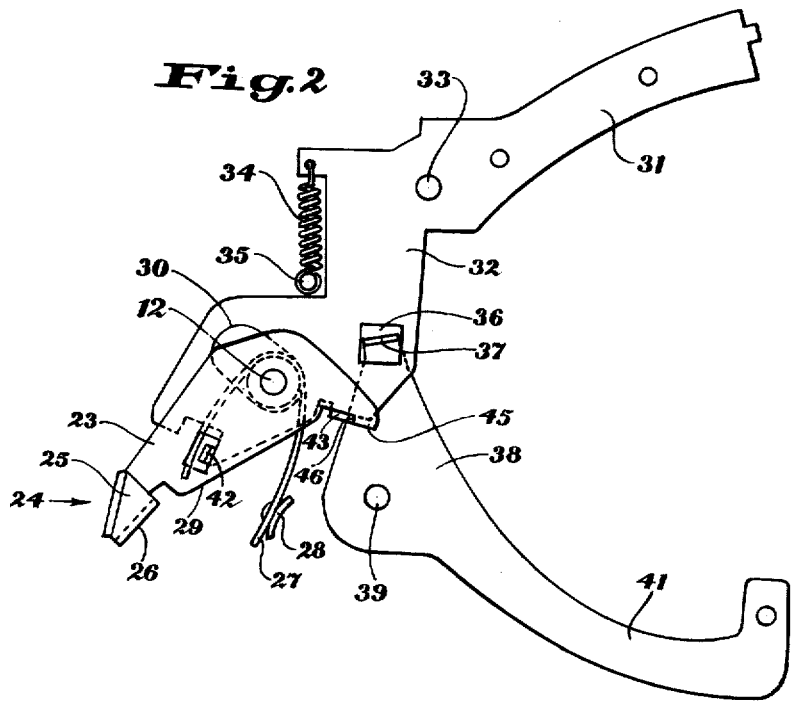
FIG. 2 is an elevation view of of the loop-former latch mechanism part from the remaining projector structure for purposes of clarity.

The loop-former latch mechanism seen best in FIG. 2 comprises a trigger lever 23 pivotal about sprocket shaft 12 and having a substantially U-shaped film guide member 24 at one end thereof having side flanges 25 and a base 26 through which film 13 is guided. The trigger lever 23 is mounted so that guide member 24 is interposed between sprocket 11 and take-up reel 8. The trigger lever 23 is urged in a clockwise direction by a wire spring 27 wound around sprocket shaft 12 and having one end engaging a stop 28 formed by projector 6, and the opposite end passing through a small opening 29 in lever 23 for connecting spring 27 thereto. The upper loop-former 18, see FIGS. 3 and 4, is secured by any suitable means to an arm 31, see FIG. 2, formed by a bracket 32 pivoted around spindle 33. A helical spring 34 has one end connected to a projector stud 35 and the opposite end connected to bracket 32 for urging the bracket in a counterclockwise direction about spindle 33. The bracket 32 has a slot 30 through which shaft 12 extends and a slot 36 struck out therefrom through which a lip 37 extends. The lip 37 is formed by a plate 38 pivoted about spindle 39, and plate 38 has an arm 41 to which lower loop-former 19 is secured by any suitable means. As a result of the lip 37 and slot 36 connection, movement of upper loop-former 18 into its open or closed position automatically moves lower loop-former 19 in its open or closed position respectively. Bracket 32 further has an ear 42 extending through opening 29 in trigger lever 23 to form a stop against which trigger lever 23 is urged by its spring 27, and further engages trigger lever 23 and urges it in a counterclockwise direction against the bias of its spring 27 when loop-formers 18, 19 are moved into their open position by spring 34, which is stronger than spring 27. Bracket 32 also has a lug 43 that cooperates with a shoulder 46 of a hook 45 formed by trigger lever 23, as best seen dotted in FIG. 3, to form a latch for releasably holding loop-formers 18, 19 in a closed position against the bias of spring 34. A guard lever 47 pivoted about shaft 12 as seen in FIGS. 3 and 4 overlies trigger lever 23, and one end thereof has a laterally extending substantially inverted U-shaped guard portion 48 overlying guide member 24 as seen in FIG. 5. The guard lever 47 further has a lip 49 adapted to engage an edge of bracket 23 in its latched position as seen in FIG. 3 to form a stop for guard lever 47. The guard portion 48 in its stopped position functions as a guide for deflecting the film 13 toward guide member 24, and further protects trigger 23 from accidental release.

In the operation of this invention, let us assume initially that the operator desires to project a film 13 through projector 6. The operator initially manually depresses upper loop-former 18 into its closed position pivoting bracket 32 in a clockwise direction against the bias of its spring 34. Pivotal movement of bracket 32 and ear 42 allows trigger lever 23 which is biased against ear 42 by spring 27 to be pivotally urged in a clockwise direction into its operative or latching position as seen in FIGS. 2 and 4. In this latching position, bracket lug 43 and trigger lever hook 45 are designed so that an edge of lever 23 engages lug 43 with hook 45 disposed in front of lug 43. It is obvious, therefore, that any attempt to open loop-formers 18, 19 is prevented by lug 43 striking shoulder 46 of hook 45. Since the loop-formers 18, 19 are now being releasably held in their closed position by the latch, the operator inserts the leading end of film 13 into projector 6 in engagement with sprocket 11 which transports film 13 to and from film gate 9 through loop-formers 18, 19 respectively. The film 13 as it leaves loop-former 19, is directed into engagement with the lower portion of drive sprocket 11 which transports film 13 over a guide roller 51 seen in FIG. 4. The film end strikes guard portion 48 which deflects the film over guide member 24 of latched trigger lever 23 and on toward take-up reel 8. The resilience or rigidity of film 13 is sufficient so that its leading end engages the periphery of ring 21 of reel 8 which is rotating, and the projections 22 automatically engage the perforations in film 13 for winding the film on reel 8. In the latched position of trigger lever 23 as seen in FIG. 4, base 26 of guide member 24 and film 13 in engagement therewith, are located on one side of a straight line 52 (shown by a dotted line in FIG. 4) which is tangent to the peripheries of guide roller 51 and ring 21. This straight line is the normal or shortest path that a tensioned film 13 would follow as it is being wound onto reel 8. As soon as film 13 is engaged by projections 22 on take-up reel 8, it is subjected to a film tension, the degree of which is determined by the torque of take-up reel 8. The film tension is sufficient to pull film 13 from its solid line path shown in FIG. 4, into its more direct normal path along dotted line 52 urging base 26 and guide member 24 in a counterclockwise direction releasing the latch by withdrawing shoulder 46 of hook 45 from lug 43. As soon as the latch is released, spring 34 immediately pulls bracket 32 and loop formers 18, 19 into their open position. As bracket 32 is pivoted in a counterclockwise direction, ear 42 engages trigger lever 23 and moves it in a counterclockwise direction, against the bias of its spring 27, which is weaker than spring 34, thereby positively withdrawing guide member 24 away from film 13 so that the film is completely free of guide member 24 during normal operation of projector 6 as seen in FIG. 3. In the latched position of trigger lever 23 as seen in FIG. 4, lip 49 of guard lever 47 engages an edge of bracket 32 which positively prevents any pivotal movement of guard lever 47 in a counterclockwise direction. In this position, guard portion 48 overhangs or overlies guide member 24 as seen in FIG. 5 and prevents inadvertent release of trigger lever 23 by the operator. When trigger lever 23 is moved into its unlatched position, guard lever 47 is moved therealong by virtue of gravity and the connection between lip 49 and bracket 32 until guard portion 48 engages the edges of film 13 as seen in FIG. 3 and rides thereon during the projection of film 13.

The invention has been described in detail with particular reference to a preferred embodiment thereof, but it will be understood that variations and modifications can be effected within the spirit and scope of the invention as described hereinabove and as defined in the appended claims.

I claim:

1. In an automatic self-threading motion-picture projector, the combination comprising: a film supply reel; a driven film take-up reel having means for automatically gripping the end of a film fed thereto for winding said film on said take-up reel; a film gate; film transport means for transporting film from said supply reel to said film gate and from said film gate to said takeup reel; loop-formers through which said film is guided interposed between said film gate and film transport means and movable between a closed position in which said film is threaded through said projector and an open position in which said film forms free loops on both sides of said film gate; a first spring urging said loop-formers into their open position; a latch movable between a latched position for releasably holding said loop-formers in their closed position against the bias of said first spring, and a released position in which said loop-formers are released for movement to their open position; and a release trigger for said latch movable between operative and inoperative positions for releasing said latch, and including a guide member formed by a portion of said trigger interposed between said film transport means and said take-up reel and adapted in the operative position of said trigger to contact said film for guiding the same free of tension and in a devious path from said film transport means to said driven take-up reel whereupon it is automatically attached to the driven reel by said gripping means and is subjected to a tensile force causing said film to travel in a normal substantially straight path from said film transport means to said take-up reel, said guide member and trigger being movable to release said latch for movement to its inoperative position by tensioning of the film upon engagement of the film by said gripping means and movement of said film from said devious path into a more direct path in its passage from said film transport means to said take-up reel.

2. The invention according to claim 1 wherein a guard member is in register with and overlies said trigger to prevent inadvertent release thereof by the operator.

3. The invention according to claim 1 wherein said guide member is substantially U-shaped.

4. The invention according to claim 3 wherein said trigger is pivotal.

5. The invention according to claim 4 wherein a pivotal guard member has a substantially inverted U-shaped guard portion at one end thereof in register with and overlying said guide member.

6. The invention according to claim 1 wherein a second spring urges said trigger into its operative position, and a lug on one of said loop-formers engages and urges said trigger against the bias of said second spring withdrawing said trigger from engagement with said film as said loop-formers are moved by said first spring into their open position upon release of said latch by said film.

7. The invention according to claim 6 wherein said first spring is stronger than said second spring.

8. In a loop-former mechanism through which a film is guided for automatically threading said film in a film path through a motion-picture projector, onto a take-up reel having film gripping means, and forming free film loops in said film, the combination comprising: upper and lower loop-forming means movable between a closed position in which said film is threadedly through said projector, and an open position in which free loops are formed in said threaded film; a first spring for urging said loop-forming means into the open position; a latch for releasably holding said loop-forming means in the closed position against the bias of said spring; a release trigger for said latch having a film guiding member integral therewith which in the operative position of said trigger engages and guides said film toward said take-up reel, a guard member in register with and overlying said trigger to prevent inadvertent release of said trigger by an operator, said trigger and guiding member being movable by said film by a shifting of a part of the film path to release said latch and permit movement of the loop-forming means to the open position, the shifting of said part of the film path being caused by a tensioning of said film upon engagement of said film with the reel gripping means.

9. The invention according to claim 8 wherein said trigger is pivotal and said film guiding member at one end thereof is substantially U-shaped.

10. The invention according to claim 9, wherein said guard member has a substantially inverted U-shaped guard portion in register with and overlying said guide member to deflect said film toward said guiding member.

11. The invention according to claim 8 wherein a second spring urges said trigger into its operative position, and a lug on one of said loop-formers engages and urges said trigger against the bias of said second spring withdrawing said trigger from said film as said loop-formers are moved by said first spring into their open position upon release of said latch.

12. The invention according to claim 11 wherein said first spring is stronger than said second spring.

13. In a loop-former mechanism through which a film is guided for automatically threading said film in a film path through a motion-picture projector, onto a take-up reel having film gripping means, and forming free loops therein, the combination comprising: a pivotal bracket; an upper loop-former carried by said bracket; a pivotal plate; a lower loop-former carried by said plate; interconnecting means between said bracket and said plate so that pivotal movement of said upper loop-former between a closed position in which film is threaded through said projector and open position in which free loops are formed in said film causes a corresponding movement of said lower loop-former; a first spring for urging said loop-formers into the open position; a latch member movable to and from a latching position in which a portion thereof co-operates with a part of said bracket to latch said loop-formers in the closed position, said latch member including a film guide member which in the latching position of said latch member engages and guides said film onto said take-up reel, and a guard member in register with and overlying said guide member to deflect said film toward said guide member, the latch member and guiding member being movable by said film by a shifting of a part of the film path, to release said loop-formers from the closed position and permit movement to the open position, the shifting of said part of the film path being caused by a tensioning of said film upon engagement of said film with the reel gripping means.

14. The invention according to claim 13, wherein said film guide member is substantially U-shaped and said guard member has a substantially U-shaped guard portion in register with and overlying said film guide member, said guard member being movable and having a stop member engaging said bracket when latched to hold said guard member in a position to prevent inadvertent release of said latch member by an operator.

15. The invention according to claim 14 wherein a second spring urges said latch member and guide member into its operative position latching said loop-formers into the closed position, and a lug on said bracket engages and urges said lever against the bias of said second spring withdrawing said film guide member from said film as said loop-formers are moved by said first spring into their open position upon release of said latch.

16. The invention according to claim 15 wherein said first spring is stronger than said second spring.

17. In an automatic self-threading motion-picture projector of the type in which a film is fed by film transport means through a film gate to a driven film take-up reel having means for automatically gripping the end of a film fed thereto for winding on said take-up reel, and including movable loop-formers through which said film is guided in its passage between said film gate and film transport means, said loop formers having a closed position which they occupy when film is being threaded through said projector and an open position in which said film forms free loops on both sides of said film gate and toward which open position they are biased; the improvement comprising a latch movable between a latched position releasably holding said loop-formers in their closed position and an unlatched position in which said loop-formers are released for movement to their open position, bias means urging said latch to the latched position, and a release trigger for said latch including a guide member formed by a portion of said trigger interposed between said film transport means and said take-up reel and normally positioned to contact and guide the film free of tension and in a devious path from said film transport means to said driven take-up reel, said guide member and trigger being movable to release said latch for movement to the unlatched position by tensioning of the film upon engagement of the film by said gripping means and movement of said film from said devious path into a more direct path in its passage from said film transport means to said take-up reel.

References Cited in the file of this patent

UNITED STATES PATENTS

| 1,899,279 | Lessler | Feb. 28, 1933 |
| 2,024,660 | Riddell | Dec. 17, 1935 |

UNITED STATES PATENT OFFICE
CERTIFICATE OF CORRECTION

Patent No. 3,081,925                                March 19, 1963

George H. Hanken

It is hereby certified that error appears in the above numbered patent requiring correction and that the said Letters Patent should read as corrected below.

Column 1, line 45, before "transport" insert -- film --; column 2, line 65, after "also" insert -- has --; column 4, line 65, for "threadedly" read -- threaded --.

Signed and sealed this 5th day of November 1963.

(SEAL)
Attest:

ERNEST W. SWIDER
Attesting Officer

EDWIN L. REYNOLDS
Acting Commissioner of Patents